3,137,554
PURIFICATION BY CRYSTALLIZATION WITH A VOLATILE REFRIGERANT
Edwin R. Gilliland, Arlington, and Warren K. Lewis, Newton, Mass., assignors to Esso Research and Engineering Company, a corporation of Delaware
Filed Sept. 11, 1956, Ser. No. 609,127
5 Claims. (Cl. 62—58)

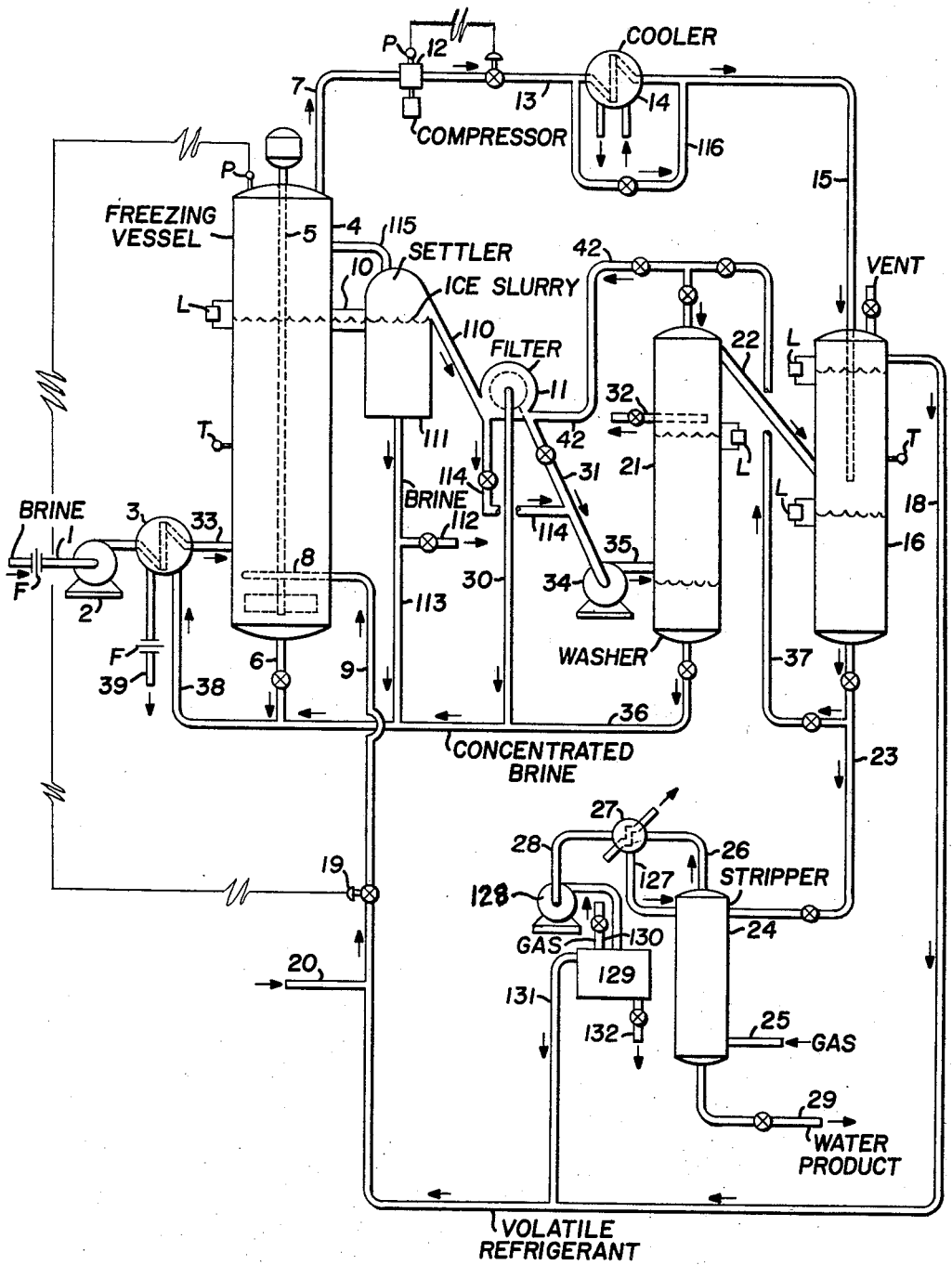

This invention relates to a means and method for purifying aqueous salt solution by freezing of the water in the solution contacted with a volatile refrigerant. In particular, this method is useful in demineralizing brine, sea water, or similar salt solutions.

A principal object is to obtain separation of high purity water with high efficiency by eliminating heat transfer through solid surfaces at freezing temperatures.

For objects of the present invention, a substance more volatile than the water or liquid to be crystallized is used as a refrigerant in the crystallization or freezing zone; e.g., for freezing water in brine, the admixed refrigerant is volatilized, evacuated from the freezing zone, then compressed, cooled and condensed by contact with cold ice product, which has been separated from the mother liquor brine.

For the operations of the present method, the refrigerant should effect freezing of the liquid to be crystallized by direct contact removal of the latent heat in the crystallization zone. The refrigerant vapors should be capable of being condensed by being compressed and brought back into contact with cold crystal product. Also, the refrigerant should be a substance which can be separated from the melted crystal product.

In demineralizing water, propane serves as a suitable non-toxic refrigerant for removing heat from the freezing zone, for recondensation and for separation from the remelted ice crystals to produce potable water. Other suitable refrigerants for special purposes will be discussed later.

In the preferred method, a very helpful feature is the step of washing the ice crystals free of brine impurities held interstitially before contact of the ice with recompressed refrigerant.

The preferred method and steps of the present invention will be described, preferably with reference to the schematic flow diagram in the drawing.

Referring to the drawing, the liquid feed of brine or contaminated liquid to be treated is passed from the feed line 1 by pump 2 through a heat exchanger 3 to lower the temperature of the liquid feed to a temperature short of freezing. The precooled liquid feed is pumped through line 33 into the freezing or crystallization vessel 4. This vessel and other apparatus holding freezing temperature material may be insulated to reduce loss of cooling efficiency.

Vessel 4 may be equipped with an agitating or stirring means 5, a bottoms brine drain line 6, an overhead vapor removal conduit 7, a refrigerant distributing means 8, which is connected to an inlet 9 for the liquid refrigerant, and ice slurry withdrawal conduit 10. Practically all the necessary internal agitation and circulation of the freezing mixture can be obtained by the bubbling of the volatile refrigerant from 8.

The impure feed liquid or brine to be subjected to refrigeration may be continuously passed into vessel 4 to maintain a liquid level therein at the inlet to slurry withdrawal conduit 10. Some turbulence occurs in the upper part of the liquid brine-ice slurry in vessel 4.

The refrigerant is fed into the lower part of the brine within vessel 4 at a sufficient rate to maintain the freezing temperature below 0° C. for crystallizing out the water to be purified, depending on the extent of crystallization desired, thus leaving a more concentrated brine solution carrying the water crystals as a floating slurry. The resulting slurry mixture of crystals may be withdrawn in batches or continuously through conduit 10 to settling chamber 111.

In chamber 111, more quiescent conditions make the ice thicken at a top layer which overflows through line 110 to the filter 11 or, alternately, by line 114 to the washer 21. Thus, settled brine may be passed by line 112 from settler 111 to a similar freezing vessel for a second stage freezing or the thus settled brine can be withdrawn by line 113 for removal from the system, or recycle to line 33.

The settler 111 has a top gas vent 115 for removing refrigerant vapors so that they can be returned to commingle with the refrigerant vapors leaving the freezing vessel 4. This vent also acts to equalize the pressure in vessel 4 with the pressure in vessel 111. In the slurry conduit 110 a gas trap or separator, not shown, may be inserted for further venting or refrigerant from the slurry insofar as some liquid refrigerant might remain fortuitously with the ice slurry withdrawn from the settler. In general, provisions are to be made for venting gas from all high points in the system.

Although a filter is shown in the drawing as an alternative means for separating the ice from the brine and also for washing the ice, it is to be understood that there are advantages in eliminating the use of the filter, i.e., filter 11, by having the ice slurry pass through line 114 with aid of the slurry pump 34 to the washer 21. When the filter is used, the washed separated ice crystals can be reslurried in sweet water (water with low salt content) and then be pumped directly to the refrigerant condensing vessel 16 without having to pass through a washing step in the washer 21. The slurry pump 34 must be capable of handling the solid-in-liquid slurry mixture.

If a stage operation is used, two or more freezing units such as described are operated in series but separate evacuating compressors may be used with each freezing vessel to save power. The operating pressure of the first freezing unit is relatively high and pressure of the succeeding units should be progressively lower, but each compressor should compress preferably to the same discharge pressure.

The dispersed refrigerant passing up through the body of liquid or brine in vessel 4 undergoes vaporization under a suitable reduced pressure which is obtained by withdrawing the vapors through a suction and compression pump 12 in conduit 7. This pump may be a reciprocating, rotary, or jet compressor, or other suitable pumping device which preferably lowers the vapor pressure in vessel 4 down to about 3000 to 3500 mm. Hg abs. or lower, depending on the refrigerant, the temperature, and the degree of crystallization desired. The pump device 12 at the same time compresses the vapors evacuated from vessel 4 to a pressure in the range of several atmospheres and passes them on through conduit 13 through a heat exchange cooling means 14 or its by-pass 116. In the cooling means 14, available cooling fluid such as salt-water or spent impure liquid from the system may be used. The pump 12 may have control connections with thermostats and liquid level controls in other parts of the system, as for example, in the refrigerant condensing vessel 16 to maintain the desired temperatures and liquid levels therein. A bypass line 116 for the refrigerant vapors around the cooler 14 may be used similarly in adjusting temperatures and liquid levels.

The compressed refrigerant vapors from vessel 4 are passed on through line 15 into condensing and separating means 16 for condensation of the refrigerant vapors by direct contact with purified frozen crystals of ice. In this condensation step, the purified or washed ice slurried in sweet water is melted while the refrigerant is condensed to a liquid.

The condensed refrigerant, being preferably a substance which is immiscible with or only slightly soluble in the melted ice water, can be separated from the ice water by decanting as it floats above the water in the form of an upper oil phase. The refrigerant can thus be drawn off through pipe 18 for return through expansion valve 19 in line 9 to the refrigeration vessel 4. Make-up refrigerant may be added through line 20.

The ice slurry is supplied to vessel 16 from the washing unit 21 by way of conduit 22. This ice, which has been purified by washing, is remelted in vessel 16 and the ice water is withdrawn from vessel 16 by line 23 and a substantial part of this water is passed to vessel 24. Vessel 24 encloses a stripping zone for removing traces of refrigerant. For example, steam or warm inert gas may be injected from inlet 25 into the bottom of vessel 24 having the form of a fractionating column to displace the refrigerant, and the volatile refrigerant will then be vaporized and drawn off through overhead pipe 26. The distilled refrigerant passed by line 26 to the cooling condenser 27 can be returned to the system if desired. The purified liquid-water is withdrawn from vessel 24 through line 29.

Water condensate collected in the condenser 27 may be refluxed by line 127 to the stripping vessel 24. The uncondensed vapor and gas which passes through the condenser 27 is led by line 28 through the evacuating compressor 128 into a receiver 129. Uncondensed gas is vented from the receiver through line 130. Condensed liquid refrigerant which stratifies as an upper liquid phase in the receiver 129 is withdrawn to be recycled by line 131 to the freezing vessel 4. Water condensate is withdrawn by line 132.

If one wishes to use a rotary filter 11, a centrifuge, or the like, for removing ice from the ice-brine slurry formed in the crystallizing vessel 4, the brine filtrate is removed from the filter through line 30. The ice crystals separated by the filter may be washed thereon then be scraped into a slurry conduit 31 and slurried at the same time with sweet water having a low salt concentration, such as can be withdrawn from the condensing vessel 16 and supplied through line 42. The ice slurried in the low salt content water may be passed by slurry pump 34 directly to the condensing vessel 16. Generally, the use of a filter means is preferably omitted, since the washing step which is to be described with reference to the washing vessel 21 functions in an outstanding manner for transferring the ice from the brine to sweet water.

The heavier clear brine liquor is removed from the bottom of wash vessel 21 through line 36. Salt-free ice water is supplied through line 37 to the upper part of the washing vessel 21 to act as the suspension medium for the rising ice crystals. The salt-free ice water may be part of the ice water product withdrawn from the condenser 16 through line 23. Thus, in the washing vessel 21, the ice crystals are freed of interstitial brine. At the upper part of the washing vessel 21 the ice crystals become slurried in ice water which is substantially free of salt and this slurry is passed down through conduit 22 into the condenser 16 where the ice comes into contact with recompressed and cooled refrigerant as mentioned before. The ice slurry entering the washing vessel 21 from line 35 enters a zone of brine-ice mixture from which the ice particles pass upwardly. Below brine-ice mixture is a zone of clear (ice-free) brine. Further up the vessel 21 the ice particles become slurried in sweet water led into the top of the washer by line 37. Thus four different zones or layers of materials may be said to exist in the washer 21; (1) a bottom layer of clear brine up to about the inlet from line 35, (2) a zone of low ice concentration in brine above inlet 35, (3) a zone of high ice concentration in brine up to the level L, and (4) a top zone of ice in sweet water. There may be some turbulence just above the inlet 35; also in the top of the vessel on the level of the outlet line 22 and where the sweet water is entered from line 37; otherwise, turbulence is kept at a minimum to prevent excessive mixing of the sweet water with the brine. However, to keep a sharper separation between the brine and the sweet water at the interface where brine meets sweet water, brine slightly diluted by the sweet water may be removed slowly or intermittently at this level through an outlet 32. This brine diluted with sweet water may be recycled to the freezing vessel 4.

In the refrigerant condensing and ice-melting vessel 16, the interface of the clear water in the lower part with ice slurry in the upper part is kept adjusted by liquid level means which may be connected to control the running rate of the compressor 12; also, the temperature of vapors passed through line 15 may be controlled; e.g. by use of the cooler 14 and the by-pass 116.

The spent brine liquor drained from the bottom of wash vessel 21 by line 36, drained from the filter 11 by line 30, drained from the crystallization vessel 4 by line 6, and drained from settler 111 by line 113 may be passed through line 38 through the precooling heat exchanger 3 to remove heat from the feed liquid and then be discarded through line 39. Portions of this cold spent brine may be used for cooling in other parts of the system. It may be stripped of refrigerant by the method used for product water.

Various known control means are to be used, e.g. liquid level (L), flow (F), temperature (T), and pressure (P) controls where needed in the system.

The following example is given to illustrate the practice of the process using the kind of apparatus described.

*Example*

A saline water feed typical of salt water which contains 35 wt. percent salt, principally sodium chloride, is precooled to a temperature in the range of 0 to 10° C. by indirect heat exchange with cold spent brine from which ice has been removed. The spent brine enters its heat exchange tube at below 0° C., i.e., from −2° to −5° C. This salt water feed enters its heat exchange conduit at about atmospheric temperature of about 25° C. The precooled salt water feed is passed at a feed rate of 0.1 volume feed per volume freezing zone capacity per minute into the insulated freezing zone which holds 100 gals. of the liquid and is contacted with dispersed liquid and vapor propane undergoing vaporization under a pressure of 3000 to 3200 mm. Hg. absolute. The liquid propane is fed into a bottom part of the crystallization zone at a rate of 0.1 lb. per lb. of brine feed to maintain ice-forming temperature of −3° to −5° C. in the crystallization zone by vaporization. Mixing of liquids is accomplished by the agitating effect of the propane vapors evolved, which aids in forming a slurry of the ice in brine at the upper part of the liquid mass or column within the freezing vessel. Vapors of propane mixed with some vapors of water are evacuated from the crystallization zone by pumping means which compresses the vapors to a pressure of 70 to 100 p.s.i.a. These compressed vapors are cooled by indirect heat exchange to a temperature of 2° to 5° C.

The thus compressed and cooled vapors of propane and water are passed directly into the bottom of a slurry of washed ice in ice water substantially free of salt in an ice melting tank, which serves simultaneously as a condenser of the compressed propane and water vapors, the propane thus forming a liquid which floats as an upper layer on the ice water at 0° C. Ice water is drawn from the ice melting-refrigerant condensing zone at a rate of 0.2 vol. clear water/vol. of brine feed and about 50% of this ice water is passed to a propane stripper in which small amounts of propane are evacuated at 30° to 50° C. under subatmospheric pressure using steam as a stripping gas. The other portion of the salt-free ice water drained from the ice melting tank is recycled to an ice-brine slurry washing zone to wash the brine from the ice crystals, this ice having been separated from the ice brine slurry formed in the crystallization zone. In the ice washing zone the ice rises spontaneously countercurrent to salt-free water used as a washing liquid, so that at the top of the washing zone the amount of salt present in the water is at a low concentration which can be 0.001% or less. Diluted brine withdrawn from an intermediate part of the washing zone can have a low concentration of salt amounting to .01 to .001%.

With the kind of operation described in the foregoing example the amount of salt impurities can be reduced economically to less than 300 parts per million (p.p.m.), thus making a purified water product which is potable and which can be used for agricultural, irrigation and industrial processes.

The operations have been described with regard to the use of propane as the refrigerant. Other organic refrigerants may be used, such as halogenated hydrocarbons, e.g. $CCl_2F_2$ and methyl chloride. For obtaining drinking water nontoxic organic refrigerants are used. Also, carbon dioxide may be employed as a refrigerant for obtaining potable water or water for industrial and agricultural purposes. In using any of these refrigerants, adjustments can be made for the vapor pressure requirements of the refrigerant to obtain suitable freezing temperatures in the crystallization zone and proper recondensation pressures of the refrigerant when it is contacted with the ice product. The vapor pressure of the refrigerant should be well above that of water at freezing temperatures.

If the liquid refrigerant has a specific gravity higher than that of water, provisions have to be made to separate the condensed refrigerant from below the melted ice water. This requirement holds for a refrigerant such as $CCl_2F_2$.

The preferred refrigerants are substances which have a high vapor pressure relative to the vapor pressure of water or of the liquid to be frozen into crystals at the freezing temperature used. By using a refrigerant having a relatively high vapor pressure the compressor and other equipment used can be smaller with only slightly decreased thermal efficiency. Accordingly, one could use in place of propane the $C_4$ hydrocarbons or a mixture thereof despite the poorer thermal efficiency, e.g. a mixture containing butanes or butenes. Another valuable asset of the desired refrigerant is low solubility in water or the liquid that is crystallized in order to facilitate the separation of the condensed refrigerant from the melted liquid by decantation. However, it is to be noted that the refrigerant can be stripped from the water or liquid formed in the melting of the crystals. A further desirable property of the refrigerants is chemical and physical inertness, i.e. stability of the refrigerant to avoid reaction with the liquid crystallized and with the impurities present.

An efficiency advantage is obtained in using the organic refrigerants which are immiscible with water which have normal boiling points in the range of 0° C. to −50° C.

It will be understood that each step in the operation can be carried out as a batch or semicontinuous operation as well as a continuous operation.

The recycled refrigerant can be introduced as a stream of both vapor and liquid into the low pressure freezing zone to bubble up through the brine therein until a desired amount of ice slurry is collected at the upper part of the liquid brine mass, then at intervals the ice slurry can be withdrawn to a settler and/or a filter for removing concentrated brine from the ice particles. The ice particles can be washed in a batch with some more dilute brine and with water substantially free of brine.

The use of the continuous washing system, as shown, has outstanding advantages. The brine is displaced from the ice slurry entering the bottom part of the washing tower by the downflow of water. The ice crystals tend to rise to the upper part of the washing tower where the ice crystals become slurried in relatively salt-free water so that the slurry withdrawn from an upper part of the washing tower will be relatively free of salt.

In the recontacting of the recompressed and cooled refrigerant vapors with the ice crystals separated from brine, the refrigerant is condensed to a liquid at above the vapor pressure of the refrigerant at the temperature of the melting ice. The liquefied refrigerant thus can be decanted from the water formed by the melted ice. However, even when the refrigerant has a substantial miscibility with the water, it is to be noted that there are provisions for separating the refrigerant by volatilization from the water product, as by stripping. In stripping the refrigerant from the melted ice crystal product this operation can be carried out to any extent desired.

What is claimed is:

1. The process for separating demineralized water from an aqueous salt solution, which comprises cooling said solution to near its freezing point, introducing into direct contact with said solution in a freezing zone a liquid refrigerant having a higher vapor pressure than water, said freezing zone being maintained under conditions of temperature and pressure which permit said refrigerant to expand, vaporize, and move upwardly through said solution thereby forming ice crystals in said solution, removing a concentrated slurry of ice crystals and salt solution from an upper part of said freezing zone and separating salt solution from said ice crystals in a separating zone, separately removing a concentrated salt solution from the lower portion of said freezing zone, transferring said ice crystals to a condensing zone, removing refrigerant vapors from said freezing zone, compressing refrigerant vapors from said freezing zone, introducing resulting compressed refrigerant vapors into heat exchange relationship with said ice crystals in said condensing zone, wherein said compressed refrigerant vapors are lowered in temperature and condensed to form liquid refrigerant and said ice crystals are melted to form water, and recovering water resulting from said melting from said condensing zone.

2. A process in accordance with claim 1 wherein said ice crystals are separated from the salt solution in said separation zone by introducing salt solution and said ice crystals into a lower part of said separation zone, passing sweet water having a substantially lower salt content than said salt solution into an upper part of said separation zone thereby forming an interface between said sweet water and said salt solution at which turbulence is kept at a minimum and through which said ice crystals rise in passing from salt solution into sweet water, and transferring sweet water and ice crystals that have risen through said interface to said condensing zone.

3. A process for reducing the salt content of a saline solution which comprises maintaining a body of saline solution in a freezing zone, introducing a water immiscible liquid refrigerant having a higher vapor pressure than water into said freezing zone, maintaining said freezing zone at a temperature and pressure which will cause vaporization of refrigerant to thereby cool said solution by direct contact with the vaporizing refrigerant, vaporizing sufficient refrigerant to cool said solution below the freezing point of water to form ice crystals, withdrawing a slurry of ice crystals and residual solution from the upper part of said body, separately withdrawing residual solution from the lower part of said body, thereafter separating the ice crystals from the said slurry, washing said ice crystals to remove residual salt therefrom, introducing the washed crystals into a condensing zone, removing refrigerant vapors from said freezing zone, compressing said vapors so removed to a pressure sufficient to condense said refrigerant at the melting point of ice, thereafter introducing said compressed vapors into said condensing zone, directly contacting said compressed vapors with the ice crystals in said condensing zone to liquefy said refrigerant and melt said crystals, separating the resulting liquid refrigerant from the water and returning the liquid refrigerant to the freezing zone.

4. In the process defined in claim 3, the further improvement which comprises contacting said ice crystals separated from said slurry with water of progressively lower salt concentration to thereby remove residual salt therefrom.

5. A method for the recovery of fresh water from salt water which comprises injecting a refrigerant into a body of salt water, chilling said salt water by evaporation of said refrigerant therein, thus forming a slurry of ice in brine, recovering refrigerant vapors thus formed, passing the slurry of ice and brine to a purification operation, therein purifying the ice crystals to reduce the salt content thereof, passing the thus obtained purified ice crystals to a melting zone, therein melting crystals by contact with the refrigerant vapors emanating from the chilling operation to form purified water, passing a portion of said purified water countercurrent to the flow of ice crystals in said purification operation and removing purified water from said melting zone as a product of the process.

References Cited in the file of this patent

UNITED STATES PATENTS

| | | |
|---|---|---|
| 1,755,810 | Carney | Apr. 22, 1930 |
| 1,931,347 | Gay | Oct. 17, 1933 |
| 1,976,204 | Voorhees | Oct. 9, 1934 |
| 1,991,384 | Field et al. | Feb. 19, 1935 |
| 2,020,719 | Bottoms | Nov. 12, 1935 |
| 2,315,762 | Ax et al. | Apr. 6, 1943 |
| 2,458,870 | Ogorzaly | Jan. 11, 1949 |
| 2,507,632 | Hickman | May 16, 1950 |
| 2,666,304 | Ahrel | Jan. 19, 1954 |
| 2,683,178 | Findlay | July 6, 1954 |
| 2,764,488 | Slattery | Sept. 25, 1956 |
| 2,769,852 | Paulson | Nov. 6, 1956 |

FOREIGN PATENTS

| | | |
|---|---|---|
| 70,507 | Norway | June 3, 1946 |